Aug. 17, 1948.     R. BURT     2,447,312
EXPANSIBLE CHAMBER MOTOR WITH PISTON
ACTUATED VALVE FOR JOLTING MACHINES
Filed Jan. 26, 1944     3 Sheets-Sheet 1

Inventor
RALPH BURT
By Lewis D. Konigsford
Attorney

Aug. 17, 1948.   R. BURT   2,447,312
EXPANSIBLE CHAMBER MOTOR WITH PISTON
ACTUATED VALVE FOR JOLTING MACHINES
Filed Jan. 26, 1944   3 Sheets-Sheet 2

Inventor
RALPH BURT
By Lewis D. Konigsford
Attorney

Aug. 17, 1948.  R. BURT  2,447,312
EXPANSIBLE CHAMBER MOTOR WITH PISTON
ACTUATED VALVE FOR JOLTING MACHINES
Filed Jan. 26, 1944  3 Sheets-Sheet 3
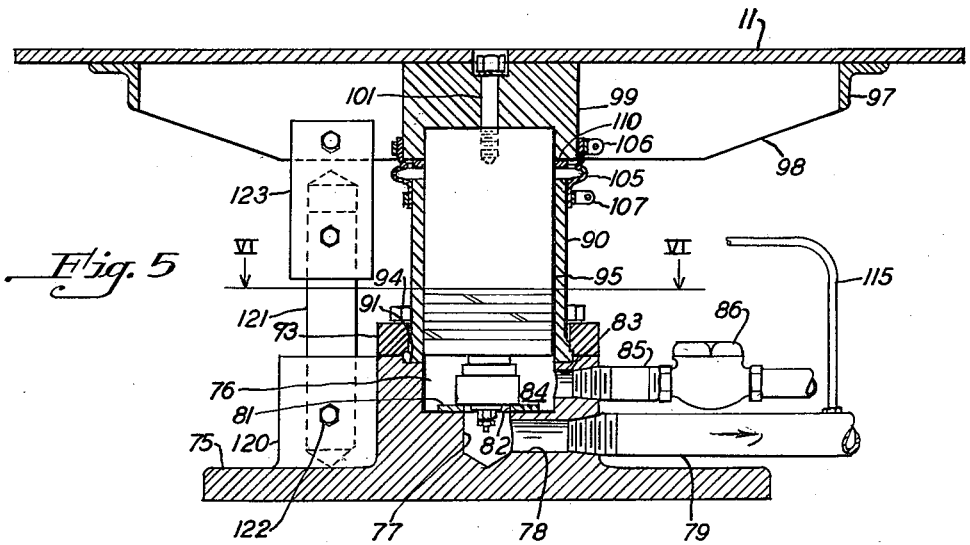
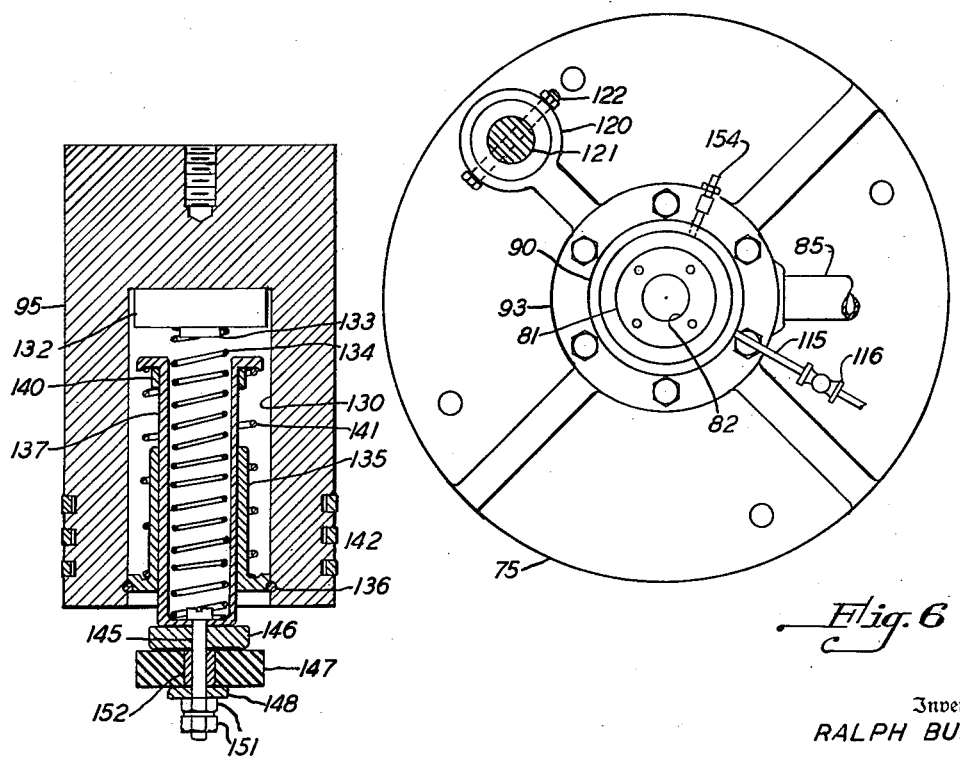
Inventor
RALPH BURT
By Lewis D. Konigsford
Attorney Patented Aug. 17, 1948

2,447,312

UNITED STATES PATENT OFFICE 2,447,312

EXPANSIBLE CHAMBER MOTOR WITH PISTON ACTUATED VALVE FOR JOLTING MACHINES

Ralph Burt, Homer City, Pa., assignor to Syntron Company, Homer City, Pa., a corporation of Delaware Application January 26, 1944, Serial No. 519,778

3 Claims. (Cl. 121—14)

The present invention relates to fluid operated vibrating or pulsating machines, such as jarring or jolting machines for foundry work or packaging materials.

It is an object of the present invention to provide a fluid operated jolting apparatus that may be directly operated by fluid under pressure.

Another object is the provision of a fluid operated jolting apparatus having an adjustable stroke and period of vibration.

A further object is the provision of a fluid operated jolting apparatus which is relatively simple in construction and can be employed for heavy duty.

Still another object is the provision of a fluid operated jolting apparatus which is of simple construction and is self starting from a source of constant pressure.

In accordance with the present invention, I provide a jolting apparatus having a chamber in which a piston responsive to pressure is located and is connected to a control valve through a yieldable or resilient linkage whereby the control valve may move with a lagging and snap action to control the period and stroke of the pressure responsive element. The piston vibrates a work supporting table. The rate of vibration of the piston and the length of its stroke may be varied by adjusting the yieldable linkage, and a pressure regulator or controller and or throttling valve may be employed to control the rate of vibration and the stroke thereof. If desired, the casing providing the pressure chamber may be movable and the piston fixed, and the work supporting table may be secured to the casing.

For a more detailed explanation of the invention, reference is had to the following specification taken in connection with the annexed drawing, wherein I have shown preferred embodiments, of the invention by way of example, and wherein:

Figure 5 shows a further modification of the invention, Figure 6 is a section taken on line VI—VI of Figure 5 in the direction of the arrows and with the piston removed, and Figure 7 is a vertical section of the piston.

Figure 1:
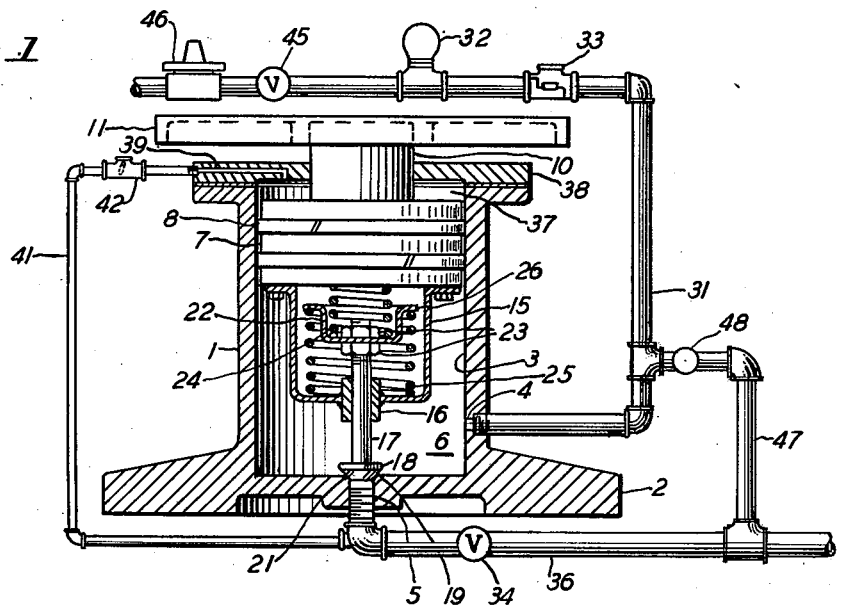
Figure 1 shows an embodiment of the invention in vertical section.

Referring to Figure 1 of the drawing, a casing 1 is suitably supported on legs 2 and has a cylindrical bore 3 therein and has inlet and outlet bores 4 and 5 respectively in the walls thereof. The cylinder is smoothly finished on the interior to provide a working chamber 6 having a piston 7 therein, rings 8 or other sealing means being provided to make a sealing fit. A post 10, which may be integral with the piston, supports a table 11 of suitable construction, and it will be apparent that the piston and table move in unison.

A flanged cylindrical spring cage 15 is secured to the underside of piston 7 in any suitable manner and has a central guide bushing 16 welded or otherwise secured thereto adapted to receive a valve rod 17 for reciprocation therein. The lower end of rod 17 carries a suitable valve member 18 which, as shown, is integral therewith and has a tapered portion 19 co-operating with a tapered seat 21 at the outlet so as to control flow therethrough. At its upper end the rod 17 has a cupped spring retainer 22 held thereon between lock nuts 23, and a helical spring 24 therein abuts the lower end of piston 7 and the bottom of retainer 22. A second helical spring 25 abuts the flange 26 of retainer 22 and the bottom of spring cage 15.

The jolting apparatus preferably is operated by water under constant pressure supplied thereto by a pipe 31 which preferably has an air chamber 32 of suitable construction on the inlet side. I prefer to provide a quick acting check valve 33 of any suitable construction on the inlet side between the chamber 32 and the cylinder 6 opening in the direction of flow, and a manually adjustable throttle valve 34 preferably is located in the outlet conduit 36 connected to the outlet 5. The upper chamber 37 of the cylinder is closed by a cover 38 suitably secured to the casing, and a conduit 39 may be provided in the cover which is connected to the outlet conduit 36 by a conduit 41 having a check valve 42 therein allowing flow toward the outlet conduit and preventing return flow. Preferably, a valve 45 is provided in conduit 31, and if desired, an inlet pressure controlled pressure regulator 46 is also provided in conduit 31. A bypass conduit 47 may be provided connecting the inlet 31 and outlet 36 with a manually operated valve 48 therein to allow the piston and table to be lowered when the apparatus is not in operation.

The operation of the apparatus will now be described. The fluid, which preferably is water under pressure, is admitted to chamber 6 through inlet 4 and exerts a pressure on the under side of the piston 7 which raises the piston and thus compresses spring 25. The area of the piston 7 is greater than the area of valve opening at 5, and a ratio of about 10 to 1 to 13 to 1 has been found to be satisfactory, although this ratio may be varied somewhat on different water pressures, and other suitable ratios may be employed. At the same time that fluid is raising the piston 7 it is also acting on the upper area of the valve 18 to hold it on its seat against the action of spring 25 until finally the compression of spring 25 is sufficient to lift the valve, thus opening outlet 5 to relieve the pressure in chamber 6, and allowing the spring 25 to decompress. The drop in pressure in chamber 6 and the mass of the piston 7 will cause it to move downward when the pressure in chamber 6 has been reduced sufficiently, and carry the valve 18 to its seat. The flow of fluid past the valve 18, which occurs when the valve is near its seat, tends to produce fluttering or chattering of the valve, and spring 24 reduces or prevents fluttering of the valve, insures proper closing thereof and cushions the downward impact of the piston and its weight against the valve. The closing of valve 18 allows the pressure in chamber 6 to build up and again raise the piston, to repeat the cycle of operation.

The piston 7 thus reciprocates or vibrates with a frequency and length of stroke dependent on several factors including the strength of springs 24 and 25, the pressure of the fluid supplied, the rate of flow allowed by the throttle valve 45, and under certain conditions the throttle valve 34 alone, or valves 45 and 34 together may be used to control the rate of flow. The frequency and amplitude also depend in part on the relative areas of the piston 7 and the opening of the valve 21. The differential pressure of springs 24 and 25 should be such as to open the valve at operating pressures to give the required stroke. The air chamber 32 and check valve 33 prevent back surges in the inlet that would produce water hammer, the air chamber 32 cushioning the water action caused by the rapid closing of check valve 33. The valve 34 preferably is set to allow a nearly uniform flow through the conduit 36 and thus prevents substantially back pressure surges that would tend to cause fluttering of the valve 18, with consequent fluttering action of the piston 7. The vent line 39 at the top chamber 37 allows any water that may leak past the piston to pass to the outlet pipe 36, and the check valve 42 therein prevents water being sucked from the outlet line into chamber 37 when the piston moves downward.

It will be noted that in the present apparatus the springs 24 and 25 provide a resilient lost motion connection between the piston and valve so that the length of stroke of the piston is adjustable by varying the time of opening and closing of the valve. Thus, by selecting or adjusting the strength or resiliency of springs 24 and 25, a relatively long stroke of the piston may be obtained or a relatively short stroke may be had with a corresponding change in the period of vibration. The period of vibration may be controlled or adjusted by varying the rate of flow of fluid supplied through the inlet connection by a suitable valve 45, or by restricting or varying the flow through the outlet, as by throttle valve 34, or by valves located in both inlet and outlet. The period of vibration may also be effected by the characteristics of the load. Normally, the heavier the load the longer the period.

While I have shown a statically unbalanced valve 18, it will be understood that this is only for purposes of illustration and that a dynamically balanced valve or any suitable type of valve may be employed instead.

Figure 2:
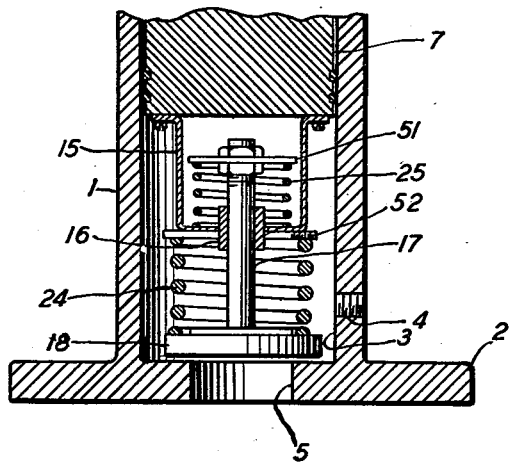
Figure 2 shows a modification of a detail of the invention in vertical section.

In Figure 2 I have shown a modification wherein valve rod 17 has a plate 51 suitably secured to its upper end to act as an abutment for spring 25, the other end of spring 25 abutting the bottom of spring cage 15. The lower end of spring 24 abuts the flat valve member 18 and plate 52 is provided engaging the cage 15 to serve as the upper abutment for spring 24.

Figure 3:
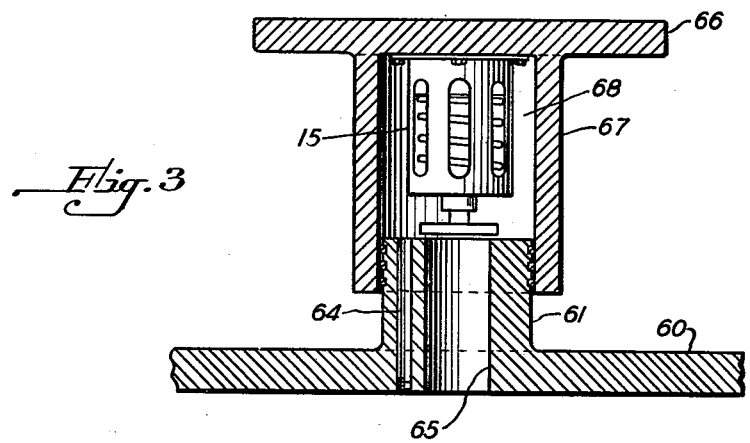
Figure 3 shows a further modification of the invention in vertical section.

In the modification shown in Figure 3 the base 60 has a central boss 61 which serves as a piston and has an inlet passage 64 and an outlet passage 65. The table 66 has a depending sleeve or skirt 67 which serves as a cylinder and provides a chamber 68 to receive the piston 61. The spring cage 15 in this modification is secured to the under surface of the table 66 and may contain any suitable spring arrangement, for example, that shown in Figure 1. In operation of this modification the piston is fixed and the table and cylinder vibrate or reciprocate.

Figure 4:
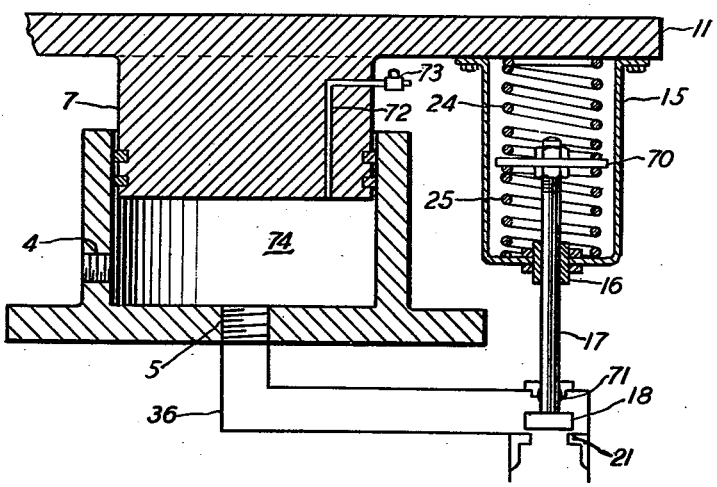
Figure 4 shows a further modification of the invention partly diagrammatic and in vertical section.

In the modification shown in Figure 4, which is partly diagrammatic, the outlet pipe 36 has a valve 18 therein on the valve rod 17 passing through a stuffing box 71, and a spring abutment 70 of suitable construction is secured to the end of the valve rod. The spring cage 15 is secured to the underside of the table 11 to move therewith and contains a spring 24 between the table and the plate 70, and a spring 25 between the plate 70 and the bottom of cage 15. If desired, the bushing 16 may be threaded into the cage and adjustably locked in position by suitable lock nuts and may be of suitable length to adjustably limit the stroke of the valve and piston. A vent bore 72 may be provided in the piston 7 controlled by a pet cock 73 to bleed off accumulated air from the chamber 74. In this modification the valve 18 and springs are located outside of the chamber 74, but the operation is substantially the same as previously described.

In the modification shown in Figures 5 to 7, a flanged base 75 is provided having a central cylindrical portion 76 in which is provided a large chamber 84 and a small concentric bore 77 connecting with a horizontal bore 78 serving as an outlet to which the outlet pipe 79 is connected. The bore 77 is surrounded by a valve seat member 81, shown as a flat washer held in place by suitable screws and having a valve orifice 82 therein. A bore 83 in the cylindrical portion 76 communicates with the piston chamber 84, and an inlet pipe 85 has a check valve 86 therein and a suitable control valve by which the rate of flow into the chamber 84 may be regulated, the check valve 86 preventing return flow of the liquid.

A cylindrical sleeve 90 is seated on a suitable shoulder 91 of the base and is locked in position by a suitable ring 93 held in place by bolts 94. The sleeve 90 provides a cylinder to receive a piston 95, which at its upper end carries the table 11. The table may be reinforced by a structure comprising angle irons 97, and radial ribs or webs 98 connecting with a central boss 99, or this may be a unitary casting. The table is secured to the top of the piston by a suitable bolt 101 passing through the central boss 99 and threaded into the top of the piston.

A suitable bellows 105 is secured by a clamping ring 106 around the outer periphery of the central boss 99, and by a second clamping ring 107 around the periphery of the cylinder 95, thus providing an extensible seal between the piston and the piston chamber. A bumper 110 of suitable material such as "Ameripol," rubber, or other synthetic rubber like material is interposed between the boss 99 and the top of the cylinder 90. This bumper serves to cushion the shock should air be trapped in the cylinder, or at the beginning of operation of the apparatus. After a few strokes when the air is eliminated the table movement is stopped by the water in chamber 84. A bypass connection 115 is provided extending from the upper end of the cylinder 90 to the outlet pipe 79 and contains a check valve 116 (Fig. 6) to allow flow toward the outlet pipe and thus provide for seepage past the piston. The base 75 carries a boss 120 with a bore therein which receives a post 121 held in place by a suitable screw or bolt 122. A cylindrical member 123 is secured to a table rib 98 by a suitable bolt or the like. Thus there is provided a guide for the post 121 to allow reciprocation thereof and prevent rotation of the table.

As shown in Figure 7, the piston 95 has a recess 130 therein at the upper end of which is suitably secured a bumper 132 having a central boss 133 to serve as a guide abutment for a spring 134. A flanged guide sleeve 135 is retained in the recess by any suitable means, such as a split locking ring 136, received in a recess in the wall of the chamber 130 and engaging the flange of member 135. The sleeve 135 guides the cup 137 in its reciprocation and it receives the spring 134 which abuts the bottom thereof. At the upper end the cup 137 is flanged and receives a spring centering ring 140 about which is located a spring 141 which at its opposite end abuts the flange 142 of the guide sleeve 135. A screw 145 passes through a suitable bore in the bottom wall of the cup and through a backing washer 146, a valve 147, a retaining washer 148, and the assembly is held together by lock nuts 151. The valve member 147 preferably comprises a soft or resilient material, such as rubber, or synthetic rubber material suitably mounted on a bushing 152 through which the bolt 145 passes. The piston carries a plurality of sealing rings 153, and may be lubricated by a suitable fitting 154 in a bore drilled through the cylinder 90.

The operation of the modification shown in Figures 5 to 7 is similar to that of Figure 1, and the same piping arrangement and control members therein may be provided. The extensible bellows 105 provides a seal between the table and the piston chamber that is relatively free from friction and allows a long stroke of the piston. Any other suitable type of seal may be employed for this purpose. Various modifications may be made in the invention without departing from the scope or spirit thereof.

What I claim as my invention and desire to secure by United States Letters Patent is:

1. Jolting apparatus comprising a base, a separate cylinder secured to said base, a hollow piston in said cylinder, inlet and outlet openings communicating with said cylinder, a valve controlling one of said openings, a guide sleeve in said piston, a telescoping sleeve in said guide secured to said valve, spring means abutting said sleeves, and a spring in said latter sleeve abutting said piston.

2. In a rapid operating automatic jolting motor of the hydraulic single acting expansible chamber type, the combination of a base, a cylinder provided on said base, a hollow piston in said cylinder, inlet and outlet openings communicating with said cylinder, a valve made of soft material controlling one of said openings, a guide sleeve in said piston, a telescoping sleeve in said guide secured to said valve, a spring abutting said sleeves, a resilient buffer in said hollow piston, a second spring abutting said buffer and second sleeve, a buffer between the piston and the cylinder, and a bellows sealing the joint between said piston and cylinder.

3. In a rapid operating automatic jolting motor of the single acting expansible chamber type, the combination of a housing having a chamber with inlet and outlet openings, a vibratory pressure responsive means closing the chamber and arranged to contract the chamber after having been expanded by fluid under pressure, a valve controlling the flow of fluid through one of said openings, a cup-shaped member having an outwardly projecting rim, a valve stem connecting said member and the valve, and a pair of opposed helical springs in telescopic relation supported at one of their ends by the pressure responsive means, the other ends of said springs engaging the rim and the bottom of the cup-shaped member respectively to support the valve through a resilient lost motion connection.

RALPH BURT.

REFERENCES CITED

The following references are of record in the file of this patent:

UNITED STATES PATENTS

| Number | Name | Date |
|---|---|---|
| 631,591 | Sergeant | Aug. 22, 1899 |
| 1,167,511 | Mumford et al. | Jan. 11, 1916 |
| 1,194,059 | Norcross | Aug. 8, 1916 |
| 1,259,882 | Lewis | Mar. 19, 1918 |
| 1,264,428 | Norcross | Apr. 30, 1918 |
| 1,734,020 | Pickop | Oct. 29, 1929 |
| 1,865,745 | Crangle | July 5, 1932 |
| 1,910,644 | Smith | May 23, 1933 |
| 1,932,803 | Radigan | Oct. 31, 1933 |
| 2,069,340 | White | Feb. 2, 1937 |
| 2,081,760 | Nardone | May 25, 1937 |
| 2,232,449 | Habenicht | Feb. 18, 1941 |
| 2,239,298 | Kraut | Apr. 22, 1941 |
| 2,319,608 | Kraut | May 18, 1943 |
| 2,321,423 | Rogers | June 8, 1943 |
| 2,356,306 | Davis | Aug. 22, 1944 |

FOREIGN PATENTS

| Number | Country | Date |
|---|---|---|
| 85,678 | Austria | Sept. 26, 1921 |